United States Patent [19]
Babcock

[11] 3,774,953
[45] Nov. 27, 1973

[54] ROPE PLACING TOOL
[76] Inventor: Edward R. Babcock, Yakima, Wash.
[22] Filed: May 11, 1972
[21] Appl. No.: 252,249

[52] U.S. Cl. .............................. 294/19 R, 114/230
[51] Int. Cl. ............................................. A47f 13/06
[58] Field of Search ..................... 294/19 R, 110 R;
  47/1; 56/328; 114/221, 230; 119/96, 106,
  151, 153, 154

[56] References Cited
UNITED STATES PATENTS

| | | | |
|---|---|---|---|
| 3,072,429 | 1/1963 | Stipan | 294/19 R |
| 2,700,252 | 1/1955 | Paganelli | 47/1 |
| 2,730,985 | 1/1956 | Wingate | 114/230 |
| 1,729,276 | 9/1929 | Ohlsen | 294/19 R |

Primary Examiner—Evon C. Blunk
Assistant Examiner—Johnny D. Cherry
Attorney—Watson et al.

[57] ABSTRACT

A tool for positioning a rope, or the like, over an elevated object, such as a tree limb or girder, including a substantially C-shaped element to be positioned about the limb or girder and having a means at one end for clamping one end of the rope, and a hollow tube element at its other end disposed about an elongated rod member, rope grasping means at the upper end of the rod, and spring means urging the rod's upper end inwardly of the hollow tube element, the rope grasping means being made to grasp one end of the rope upon upward movement of the rod member against the spring means.

7 Claims, 10 Drawing Figures

PATENTED NOV 27 1973 3,774,953
SHEET 1 OF 2
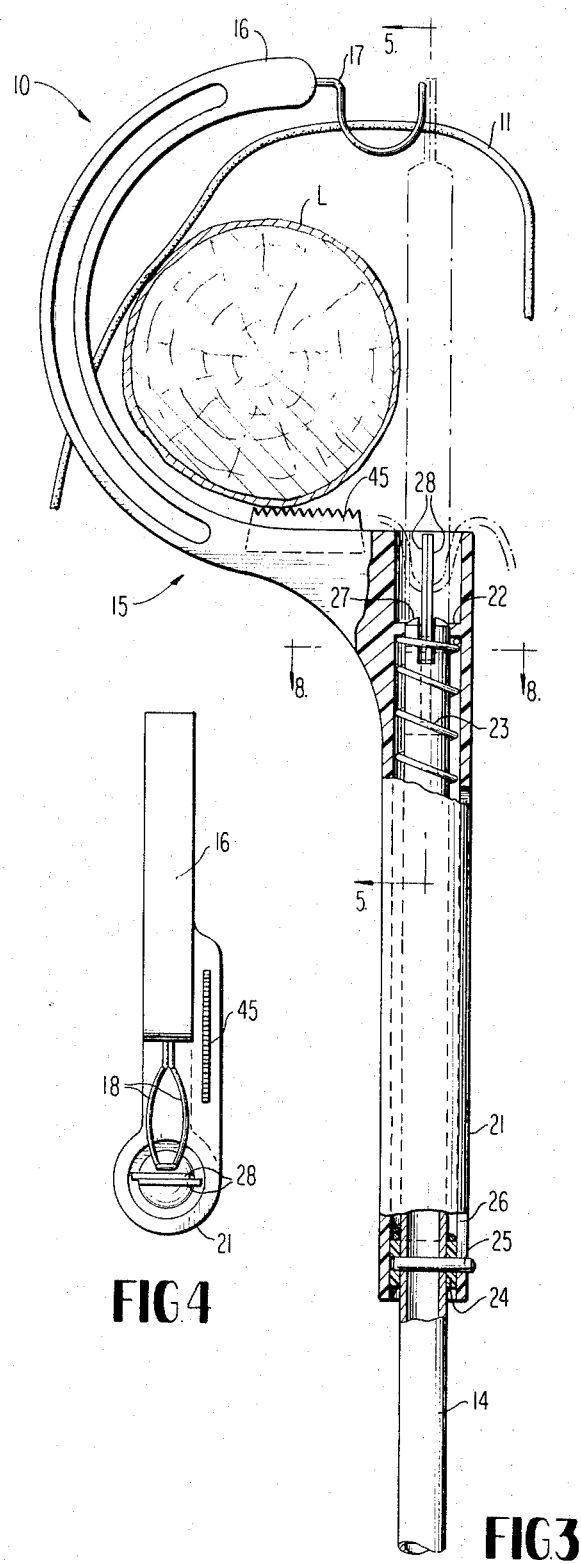
FIG. 3
FIG. 4
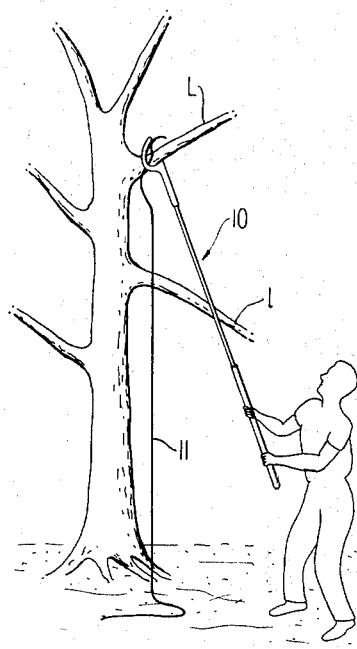
FIG. 1
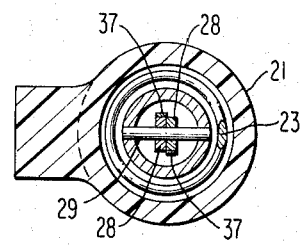
FIG. 8

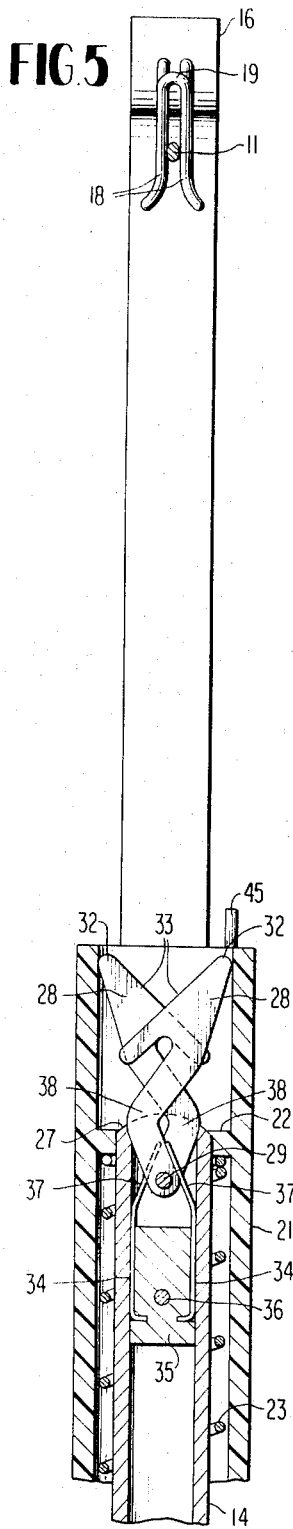
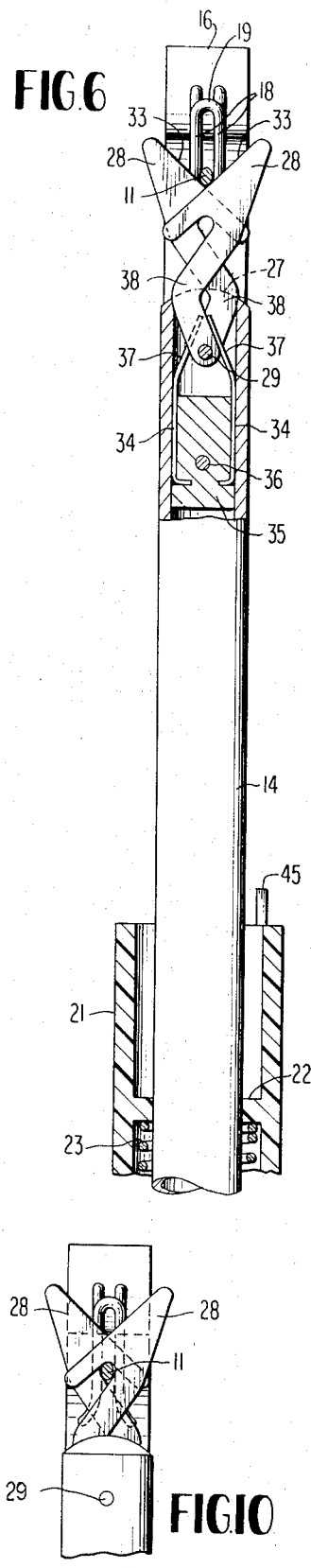
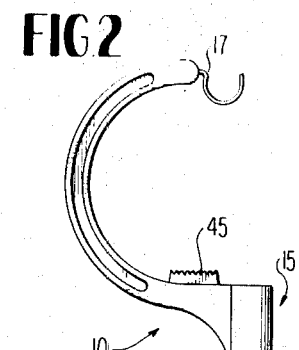
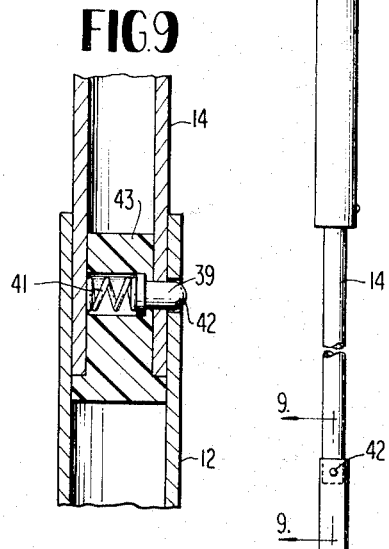
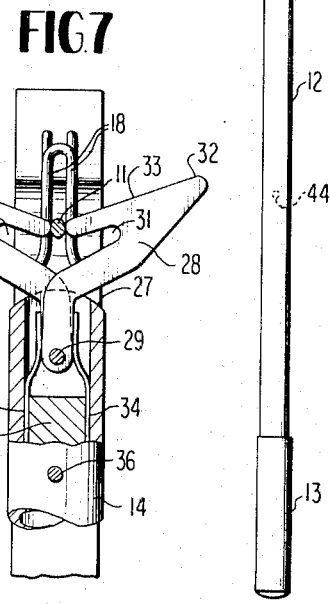

ROPE PLACING TOOL

This invention relates generally to a tool for conveniently positioning a rope, cable or the like over an elevated object such as a tree limb or girder, so that the rope may be used to support or suspend another object from the tree limb or girder.

The present invention is designed to benefit the fruit tree farmer or for that matter, anyone needing to position a rope or cable over an elevated object for the purpose of tying either another limb or object thereto. Formerly, ladders had to be used by the commercial fruit tree grower in order to reach an upper limb of the tree for the purpose of supporting a lower sagging limb therefrom by means of tying a rope or string between the two limbs. Such operation is, however, obviously unduly time-consuming and therefore only results in additional labor and other costs. Accordingly, a tool capable of being operated from the ground level has been devised to permit the operator to clamp one end of a rope or string in place on the tool before positioning it adjacent an upper limb, whereafter the rope end may be conveniently grasped by a movable portion of the tool and lowered to within the reach of the operator, thereby permitting him to tie both ends of the rope about the lower sagging limb to be suspended. This is the principal object of the present invention.

Another object of this invention is to provide such a tool as having a C-shaped head element to be placed adjacent the upper limb, a rope clamping means at one end of this element and a hollow tubular element at the other end thereof disposed about an elongated rod member serving as a handle for the tool. Inwardly biased rope grasping means are provided within the tubular element at the upper end of the rod member and are moved thereby toward the rope clamping means until the rope is engaged by the rope grasping means so that the rope may be thereafter lowered after being positioned about the upper limb.

A further object of the present invention is to provide such a tool wherein the rope grasping means comprises a pair of hook elements which are biased for movement toward one another into a closing position and are moved away from one another and opened about the clamped rope when made to engage therewith.

A still further object of this invention is to provide such a tool wherein the rope clamping means comprises a spring clip designed to clamp the rope for positioning it to lie along an axis perpendicular to the longitudinal axis of the rod member, and the hook member is so disposed as to be opened about the clamped rope during engagement therewith.

Other objects, advantages, and novel features of the invention will become apparent from the following details of the description of the invention when considered in conjunction with the accompanying drawings wherein:

FIG. 1 is perspective illustration of the rope placing tool showing the manner in which it is used;

FIG. 2 is a side elevational view of the tool in accordance with the present invention;

FIG. 3 is a view similar to FIG. 2, but slightly enlarged and showing only the top portion of the tool in its relation to an upper limb with the rope in its position on the tool before being positioned about the limb;

FIG. 4 is a top view of the tool shown in FIG. 3;

FIG. 5 is a sectional view taken along the line 5—5 of FIG. 3;

FIG. 6 is a view similar to FIG. 5, except that the hook elements of the rope grasping means are shown in their relation to the clamped rope in contact therewith;

FIG. 7 is a view similar to FIG. 6, showing the hook elements in the process of fully engaging the clamped rope;

FIG. 8 is a sectional view taken along the line 8—8 of FIG. 3, showing the manner in which the hook elements are retained in place;

FIG. 9 is a sectional view taken along the line 9—9 of FIG. 2, showing a lock means for the extendable handle; and FIG. 10 is a view similar to FIG. 7, showing the hook elements in full engagement with the rope.

Turning now to the drawings wherein like reference characters refer to like and corresponding parts throughout the several views, the hook generally designated 10 in accordance with the present invention is shown in FIG. 1 as it may be used by the operator in positioning a rope or string 11 about an upper limb L so that both ends thereof may be conveniently tied to a lower sagging limb 1 to be supported therefrom. As seen in FIG. 2, the tool generally comprises an elongated handle rod 12 having a handle grip 13 thereon, a hollow rod member 14 interconnected with rod 12, and an upper head member generally designated 15. This head member 15 may be of plastic or some other suitable material and, as more clearly seen in FIG. 3, comprises a C-shaped head element 16 having a spring clip 17 extending outwardly of one end thereof. This spring clip 17, as seen in FIGS. 4 and 5, generally comprises a pair of interconnected resilient legs 18 opening inwardly to permit one end of the rope to be clamped therebetween and to be subsequently released therefrom in a manner to be hereinafter described. The ends of the legs 18 are secured to the head element 16 and are interconnected at their opposite ends at bight portion 19. Each of the legs are substantially arcuately shaped between their ends so as to present two contact points for the rope to be clamped therebetween. Of course, the legs 18 could alternatively be slightly longer and substantially W-shaped to expose a portion of the clamped rope directly between its ends.

A hollow tubular member 21 is provided at the opposite end of head element 16 and is provided with an inwardly directed peripheral flange 22, serving as a stop member for a compression spring 23 disposed about hollow rod 14 and bearing against a bearing member 24 serving as a stop for the opposite end of the spring. A pin 25 is mounted within the bearing 24 and extends outwardly thereof and through an elongated opening 26 provided in a sidewall of the hollow tubular member 21. The bearing 24, together with pin 25 therefore, act as a stop for the opposite end of the spring to maintain the free end 27 of the rod 14 wholly within tubular member 21.

A pair of hook elements 28 are mounted at their base portions inwardly of end 27 of the hollow member 14 and are secured in place to the sidewall thereof by means of a retainer pin 29 (see FIGS. 5 and 8). Each of these hook elements is designed as having an open jaw 31 and a forward end 32. An inwardly sloping leading edge 33 extends between end 32 and jaw 31.

Each of the hook elements 28 are biased inwardly toward one-another by means of spring plates 34 which are each mounted in place by means of an insert element 35, disposed within hollow rod member 14 and secured in place by means of a pin 36 extending into the side wall of rod member 14. Each of the spring plates 34 has an inwardly sloping upper end portion 37 of a slope substantially the same as the slope of the lower legs 38 along their inner edges so as to maintain these legs in contact with the inner periphery of rod member 14 at the upper end 27 thereof.

In FIG. 9, a conventional retainer pin 39 is disclosed as being urged by means of a spring 41 into an opening 42 provided in the wall of handle rod 12, the pin 39 and its spring 41 being held in place by means of an insert 43 located within the lower end of rod member 14. Accordingly, rod member 14 may be conveniently locked in place in its fully extended position when the pin 39 is made to extend through opening 42. In order to retract rod 14 to a position disposed within rod 12 and lock it in such a retracted position, an opening 44 is disposed in the wall of rod 12 at a pre-determined distance below opening 42, in order to accommodate pin 39 for locking the rod 14 in its retracted position.

When it is desired to position the rope or string 11 about an elevated object such as a limb L, one end of the rope is manually clamped in place between legs 18 of spring clip 17, so as to extend slightly outwardly thereof, as shown in FIG. 3, along a line substantially perpendicular to the longitudinal axis of rod 14. The remaining portion of rope 11 merely hangs downwardly from the spring clip and must obviously be of sufficient length to enable the operator to tie limbs L and 1 together.

The operator then adjusts the extension of rod member 14 to accommodate the height of the elevated object or limb L, whereafter the tool 10 is raised and placed to one side of the limb L so that its head element 16 surrounds the limb in the manner shown in FIG. 3. Interlocked rods 12 and 14 are then pushed upwardly against the force of spring 23 whereupon rod 14 is moved outwardly of tubular member 21 toward the spring clip 17. In order to avoid any slippage between the tool and the limb L, against which the tool is pushed, an anti-skid element 45, having a roughened or serrated upper surface, is mounted on head element 16 adjacent hollow tubular member 21 and faces inwardly toward the spring clip.

Continued movement of the rod against spring 23 toward the spring clip will ultimately bring the leading edges 33 of the hook elements 28 into contact with the rope 11, as clearly shown in FIG. 6 of the drawings. Continued movement of the rod 14 toward the spring clip causes the hook elements 28 to be moved away from one another against the force of their respective spring plates 34 by reason of the increased force against the rope 11 which bears against each of the sloping edges 33 of the hook elements. FIG. 7 clearly shows the manner in which the hook elements are moved away from one another as the rod member continues its movement toward the spring clip. As soon as the rope clears the inner ends of edges 33, each of the hook elements will be moved toward one another under the force of their respective spring clips 34, so that both of the jaws 31 will completely engage the rope 11 in a manner as shown in FIG. 10. The rod member may then be lowered from its position shown in phantom lines in FIG. 3 to its position shown in solid lines therein, thereby bringing the clamped end of the rope with it to a position shown in phantom lines in this Figure. Since the legs 18 of spring clip 17 open downwardly, it is a simple matter for the hook elements to remove the clamped rope therefrom during retraction of rod 14.

The rope 11 is now positioned about the upper limb L. A lowering of the hooked rope to an elevation within the operator's reach simply requires the tool 10 to be moved slightly leftward until head element 16 clears limb L. Afterwards, the tool may be lowered and the string or rope removed from the tool by the operator and tied at its opposite ends about the lower limb L.

From the foregoing, it can be seen that a simple, yet reliable and easily operable tool has been devised for positioning a rope, or similar type of flexible elongated element, about an elevated object such as a tree limb, simply by extending the handle rod thereof so that a pair of inwardly biased hook elements are made to fully engage about the rope which has been clamped in place on the tool. The rod members 12 and 14 may be of aluminum and the upper head member 15 of plastic, thereby significantly reducing the weight of the tool and making it easier for handling.

Obviously, many modifications and variations of the present invention are possible in the light of the above teachings. It is therefore to be understood that within the scope of the appended claims, the invention may be practiced otherwise than as specifically described.

What is claimed is:

1. A rope positioning tool comprising, an elongated rod member, a substantially C-shaped head element having means at one end thereof for clamping one end of the rope to be positioned, a hollow tubular element at the other end of said head element, said tubular element being disposed about one end of said rod member, spring means urging said rod member away from said rope clamping means, a pair of hook elements extending outwardly of said one end of said rod member and being pivotally secured at their base portions to said rod member, each of said hook elements having a leading edge inwardly sloping toward one another to thereby present a V-shaped edge to the clamped rope before engagement therewith, resilient means cooperating with and urging said hook elements into a rope grasping position during movement of said rod member toward said rope clamping means, said resilient means permitting said hook elements to fully grasp the rope clamped by said clamping means upon continued movement of said rod until said hook elements engage the rope.

2. The tool according to claim 1, wherein said rope clamping means comprises a spring clip opening toward said hook elements.

3. The tool according to claim 2, wherein said spring clip comprises a pair of resiliently interconnected legs each lying in a plane perpendicular to the longitudinal axis of said rod member whereby said one end of the rope may be clamped therebetween to lie along an axis also perpendicular to said longitudinal axis.

4. The tool according to claim 3, wherein said hook elements are disposed to lie in a plane perpendicular to said axis along which said one end of the rope lies.

5. The tool according to claim 3, wherein an anti-skid element having a roughened surface is secured to said head element adjacent said hook elements and facing toward said rope clamping means.

6. A rope tool comprising, an elongated rod member, a substantially C-shaped head element having means at one end thereof for clamping one end of the rope to be positioned, a hollow tubular element at the other end of said element, said tubular element being disposed about one end of said rod member, spring means urging said rod member away from said rope clamping means, a pair of hook elements extending outwardly of said one end of said rod member and being pivotally secured at their base portions to said rod member, resilient means cooperating with and urging said hook elements into a rope grasping position during movement of said rod member toward said rope clamping means, said resilient means comprising a spring plate in engagement with each of said hook elements for urging them toward one another, thereby permitting said hook elements to fully grasp the rope clamped by said clamping means upon continued movement of said rod until said hook elements engage the rope.

7. A rope positioning tool comprising, an elongated rod member, a substantially C-shaped head element having means at one end thereof for clamping one end of the rope to be positioned, a hollow tubular element at the other end of said head element, said tubular element being disposed about one end of said rod member, a compression spring disposed about said rod member between stop elements provided on said rod member and on said hollow tubular element for urging said rod member away from said rope clamping means, a pin provided on said rod stop element, said pin extending outwardly through an elongated longitudinal opening provided within said tubular element, thereby serving to prevent rotation of said rod member within said tubular element, rope grasping means extending outwardly of said one end of said rod member, resilient means cooperating with and urging said rope grasping means into a rope grasping position during movement of said rod member toward said rope clamping means, said resilient means permitting said rope grasping means to fully grasp the rope clamped by said clamping means upon continued movement of said rod and until said rope grasping means engages the rope.

* * * * *